United States Patent [19]

Parsons et al.

[11] Patent Number: 4,828,379
[45] Date of Patent: May 9, 1989

[54] REAR VIEW MIRROR WITH PERPENDICULAR MIRROR SURFACES

[75] Inventors: Bryan N. V. Parsons, Stoney Stanton; Stephen H. Richardson, Solihull, both of England

[73] Assignee: Jaguar Cars Limited, United Kingdom

[21] Appl. No.: 141,930

[22] Filed: Jan. 6, 1988

[30] Foreign Application Priority Data

Jan. 24, 1987 [GB] United Kingdom ............... 8701579

[51] Int. Cl.⁴ .......................... B60R 1/06; B60R 1/08; G02B 7/18
[52] U.S. Cl. .................................. 350/626; 350/612; 350/637; D12/187
[58] Field of Search ............... 350/626, 612, 625, 637, 350/604, 636, 634, 280; D12/187

[56] References Cited

U.S. PATENT DOCUMENTS

| 3,826,563 | 7/1974 | Davis | 350/626 |
| 4,428,649 | 1/1984 | Main et al. | 350/637 |
| 4,637,694 | 1/1983 | Casteneda | 350/626 |

FOREIGN PATENT DOCUMENTS

| 1505350 | 10/1969 | Fed. Rep. of Germany | 350/637 |
| 2415559 | 8/1979 | France | 350/626 |

Primary Examiner—Jon W. Henry
Attorney, Agent, or Firm—Davis, Bujold & Streck

[57] ABSTRACT

An external rear view mirror has a first mirror surface of relatively large surface area, a second mirror surface of relatively small surface area and a mechanism for moving the first mirror surface between a first position in which it provides a rearward view and a second position in which the second mirror surface provides a rearward view.

14 Claims, 1 Drawing Sheet

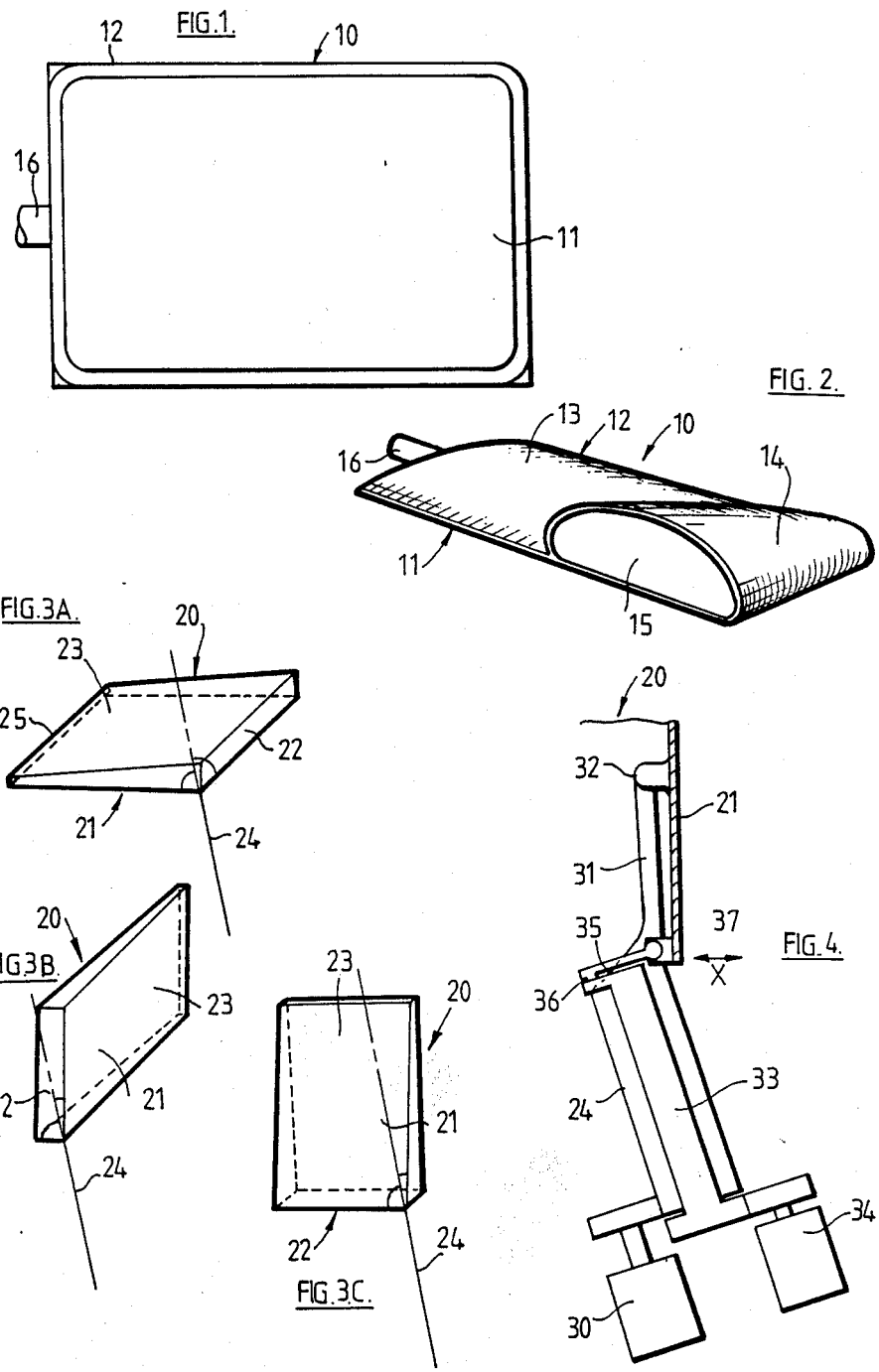

REAR VIEW MIRROR WITH PERPENDICULAR MIRROR SURFACES

BACKGROUND OF THE INVENTION

The present invention relates to rear view mirrors and in particular to rear view mirrors for fitting externally to motor vehicles.

It is common practice to fit vehicles with one or two external rear view mirrors, in order to supplement the rearward vision provided by the interior rear view mirror. These external rear view mirrors are conventionally fitted to the doors or front wings of the vehicle.

It is the current trend in motor vehicle design to minimise the drag coefficient of the vehicle, in order to improve the fuel economy and/or the performance of the vehicle. In order to provide adequate rearward vision, under all conditions, it is necessary that relatively large external mirrors are used. Attempts have been made to streamline the housing of these mirrors, but nevertheless they contribute a significant amount to the overall drag coefficient of the vehicle. Furthermore, disturbance of the air flow past the external mirrors will increase the wind noise.

SUMMARY OF THE INVENTION

According to the present invention, an external rear view mirror comprises a first mirror surface of relatively large surface area, a second mirror surface of relatively small surface area, the first mirror surface being movable between a first position in which it provides a rearward view and a second position in which the second mirror surface provides a rearward view and means for moving the first mirror surface between its first and second positions.

With this arrangement, the drag coefficient of the mirror when the first mirror surface is in the second position may be significantly reduced as compared to the drag coefficient when the first mirror surface is in the first position. Under normal driving conditions, the mirror would be adjusted so that the small mirror surface provides a rearward view to give the driver an indication of rearward traffic situation. The small mirror surface may be made convex to give a greater field of view.

Only when a more detailed picture is required, for instance when the driver wishes to overtake, would he adjust the mirror to bring the large mirror surface into view.

Preferably adjustment of the mirror to move the large mirror from its first position to its second position and vice versa would be controlled, at the touch of a switch, by electrical means. However other means, for example a suitable lever mechanism actuable manually from the driving position, could be used.

Provision must also be made for alignment of each mirror surface to suit the particular driver. This alignment may be made manually or may be controlled by electrical or other means from the driving position.

BRIEF DESCRIPTION OF THE DRAWINGS

Various embodiments of the invention are now described, by way of example only, with reference to the accompanying drawings, in which:

FIG. 1 shows a side elevation of a rear view mirror formed in accordance with the present invention;

FIG. 2 shows a perspective view of the rear view mirror illustrated in FIG. 1, in an alternative position;

FIGS. 3A to 3C illustrate an alternative form of mirror formed in accordance with the present invention, in three positions; and FIG. 4 illustrates a drive mechanism for the mirror illustrated in FIG. 3.

DESCRIPTION OF A PREFERRED EMBODIMENT

The mirror 10 illustrated in FIGS. 1 and 2 has a relatively large mirror glass 11, typically 16cms by 8cms, which is mounted in a housing 12. The reverse side 13 of the housing 12 is of streamlined configuration when viewed at right angles to the mirror glass 11 and defines a streamlined housing 14 for a small convex mirror glass 15, typically 8 cms by 3 cms. The mirror glass 15 is mounted substantially at right angles to mirror glass 11.

The mirror 10 is mounted on a spindle 16 by means of which it may be mounted to the door of a vehicle, in a manner which will allow rotation of the spindle 16. Drive means (not shown) is located on the door of the vehicle, so that the mirror 10 may be rotated; from a first position in which the large mirror glass 11 is directed rearwardly of the vehicle to provide a view thereof, the housing 12 presenting relatively high resistance to air flow; to a second position in which the small mirror glass 15 is directed rearwardly of the vehicle to provide a view thereof, while the housing 12 presents low resistance to air flow; and vice versa.

Under normal driving conditions the mirror 10 will be positioned in its second position to reduce the drag coefficient, while giving the driver an indication of rearward traffic conditions, and only when the driver requires a more detailed picture of rearward traffic conditions would the mirror 10 be rotated to the first, relatively high drag, position.

The drive means for rotating the spindle 16 would preferably be an electrical motor, but other means may be used. This drive means may be used to align the mirror glasses 11 and 15 vertically in each of the first and second positions of the mirror 10. However, further means is required to align the mirror glasses 11 and 15 horizontally. This may be achieved, in normal manner, by for example electrical motors mounted with the housing 12 or lever mechanisms adjustable manually from the driving position. Each of the mirror glasses 11 and 15 may have individual horizontal alignment mechanisms or the mirror glasses 11 and 15 may be interconnected so that both may be aligned together using a single horizontal alignment mechanism.

Where the drive means is used to align the mirror glasses 11 and 15, as well as move the mirror 10 from the first position to the second position and vice versa, the control mechanism should be such that once the mirror glasses 11 and 15 are aligned for a particular driver, the mirror glasses 11 and 15 may be set in this alignment and the mirror moved between the two positions by simple control means, without changing the alignment. In a further embodiment, the mirror glasses 11 and 15 may be aligned, both vertically and horizontally, by means separate from the drive means, the latter being used only to move the mirror 10 from one position to the other.

In the mirror 20 illustrated in FIGS. 3A to 3C, a large mirror glass 21 and small mirror glass 22 are mounted at right angles to one another in a housing 23 of substantially wedge shaped configuration. The mirror 20 is mounted on spindle 24 which is positioned at 45 degrees to each axis of each mirror glass 21 and 22. As with the previous embodiment, the spindle 24 is used to attach the mirror 20 to a vehicle door and may be rotated by drive means.

Rotation of the mirror 20 on spindle 24 may move the mirror; from a first position shown in FIG. 3B, in which the large mirror glass 21 is directed rearwardly to provide a rearward view; to a second position shown in FIG. 3A in which the small mirror glass 22 is directed rearwardly so as to provide a rearward view, the small cross section edge 25 of the wedge shaped housing 23 being directed forwardly to provide minimum drag coefficient; and to a third position shown in FIG. 3C, in which the large mirror glass 21 is positioned against the side screen of the vehicle.

As with the previous embodiment, the mirror 20 will be used in its second position for normal driving and be moved to the first position when a more detailed rearward view is required. The third position may be adopted when the mirror is knocked or to fold the mirror away when the vehicle is parked.

As with the mirror disclosed with reference to FIGS. 1 and 2, the drive means used to move mirror 20 from one position to another may also be used to align the mirror glasses 21 and 22 in one plane. However, movement of the mirror glasses 21 and 22 about another axis is required to provide full alignment. Preferably, this other axis is perpendicular to the axis spindle 24 about which the mirror 20 is rotated.

FIG. 4 illustrates a mechanism suitable for movement of the mirror 20 between the three positions illustrated in FIGS. 3A to 3C and for aligning the mirror glasses 21 and 22.

In the drive mechanism illustrated in FIG. 4, the spindle 24 is in the form of a hollow shaft which is drivingly connected to one end to an electrical motor 30. An offset arm 31 at the other end of spindle 24 is attached to the mirror 20 by pivotal connection 32 which will permit pivotting of the mirror 20 about an axis perpendicular to the axis of spindle 24 and inclined to the plane of each mirror glass 21 and 22. A drive shaft 33 is located within the hollow spindle 24 and is drivingly connected to motor 34. A push rod 35 has a pivotal connection 36 with drive shaft 33 and is connected by a ball joint 37 to mirror 20 at a point adjacent the intersection of the planes of the mirror glasses 21 and 22.

With the arrangement described above, the mirror 20 may be rotated from one position to another and each mirror glass 21 and 22 aligned in one plane, by means of motor 30 driving spindle 24. Final alignment of the mirror glasses 21 and 22 may be achieved by means of motor 34 which rotates drive shaft 33 so that the pushrod 35 will move the mirror 20 in the direction of arrow X. A combination of drive by motors 30 and 34 may thus be used to move the mirror from one aligned position to another aligned position. Preferably the motors will be used in synchronisation so that movement from one position to another will be achieved in a single movement. As with the mirror described with reference to FIGS. 1 and 2, control means of the motors 30 and 34 should include means for setting each mirror glass 21 and 22 in an aligned position, for a particular driver, and then permit movement between these set positions by a simple control operation.

With the mirrors described above, the frontal area of the mirror may be reduced by 70 to 80 per cent. This would reduce the overall drag coefficient of a car by approximately 0.02 i.e. typically from about 0.38 to 0.36, with 5% improvement.

Various modifications may be made without departing from the invention, for example while in the above embodiment, the large and small mirror glasses are set at substantially 90 degrees to one another, according to an alternative embodiment, the mirror glasses may be hinged relative to one another, a relatively small mirror glass being permanently directed rearwardly and the other relatively large mirror glass being pivotal from a horizontal position to a rearwardly directed position, to supplement the first mirror glass.

A further advantage of the type of mirror disclosed above is that the amount of light reflected will depend upon the size of the mirror surface and consequently a dipping effect may be achieved by switching from the large mirror surface to the small mirror surface. This effect may be enhanced where a small convex mirror is used by appropriate focusing of the mirror.

We claim:

1. An external rear view mirror comprising a first mirror surface of relatively large surface area, and a second mirror surface of relatively small surface area, the first and second mirror surfaces being mounted approximately perpendicular to one another on a common support and drive means being provided for adjustment of the common support between a first position in which the first mirror surface provides a rearward view and a second position in which the second mirror surface provides a rearward view.

2. An external rear view mirror according to claim 3 in which the mirror is shaped so that a significant reduction in drag coefficient is achieved when the mirror is moved from the first position to the second position.

3. An external rear view mirror according to claim 2 in which the second mirror surface is of convex configuration.

4. An external rear view mirror according to claim 3 in which the second mirror surface is of convex configuration.

5. An external rear view mirror according to claim 3 in which the common support is rotatable about an axis parallel to the line of intersection of the planes of the mirror surfaces.

6. An external rear view mirror according to claim 3 in which the common support is rotatable about an axis inclined at 45 degrees to each axis of each mirror surface.

7. An external rear view mirror according to claim 6 in which the common support is rotatable between a first position in which the first mirror surface is directed rearwardly, a second position in which the second mirror surface is directed rearwardly and a third position in which the first mirror surface is positioned substantially parallel to the vehicle.

8. An external rear view mirror according to claim 3 in which an adjustment mechanism is provided for alignment of each of the mirror surfaces, when the mirror surface is in the viewing position.

9. An external rear view mirror according to claim 8 in which the adjustment mechanism provides movement of each mirror surface about mutually inclined axes.

10. A rear view mirror according to claim 9 in which the drive means is used to provide adjustment of both mirror surfaces about one axis.

11. A rear view mirror according to claim 10 in which a common adjustment mechanism is used to align both mirror surfaces about the other axis.

12. A rear view mirror according to claim 10 in which alignment of each mirror surface may be set and the mirror moved from one aligned position to the other.

13. A rear view mirror according to claim 10 in which a first drive shaft is adapted to be driven by first motor means, to rotate the mirror between the first and second positions, and a second drive shaft adapted to be driven by second motor means is arranged to rotate the mirror about an axis perpendicualar to the axis of the first drive shaft and inclined to the planes of both mirror surfaces.

14. A rear view mirror according to claim 13 in which the first drive shaft is hollow and is attached to the mirror via an offset arm, and the second drive shaft is positioned within the first drive shaft, a push rod being connected between the second drive shaft and a point on the mirror adjacent the intersection of the planes of the two mirror surfaces.

* * * * *

UNITED STATES PATENT AND TRADEMARK OFFICE
CERTIFICATE OF CORRECTION

PATENT NO. : 4,828,379
DATED : May 9, 1989
INVENTOR(S) : Bryan N.V. PARSONS AND Stephen H. RICHARDSON It is certified that error appears in the above—identified patent and that said Letters Patent is hereby corrected as shown below:

Column 4, line 32 - change "3" to "1";

line 36 - change "2" to "1";

line 39 - change "3" to "2";

line 42 - change "3" to "1";

line 46 - change "3" to "1"; and line 57 - change "3" to "1".

Signed and Sealed this

Thirteenth Day of February, 1990

*Attest:*

JEFFREY M. SAMUELS

*Attesting Officer*  *Acting Commissioner of Patents and Trademarks*